Feb. 12, 1963  R. F. COOPER  3,077,060
TIRE SIDEWALL GRINDER AND CLEANER MACHINE
Filed Oct. 3, 1960  5 Sheets-Sheet 2
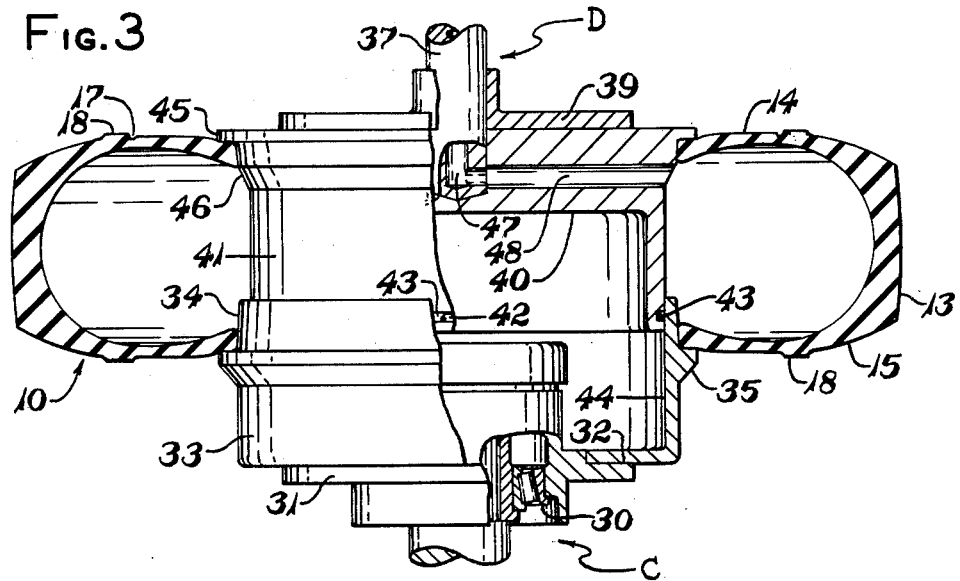
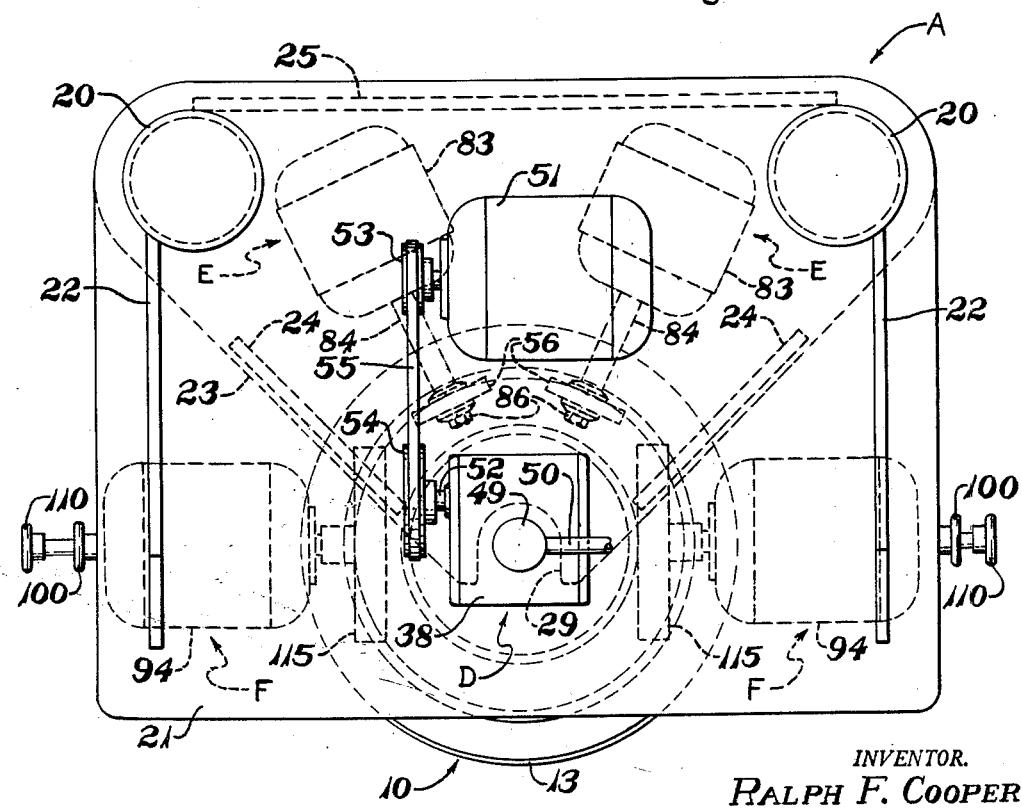
INVENTOR.
RALPH F. COOPER

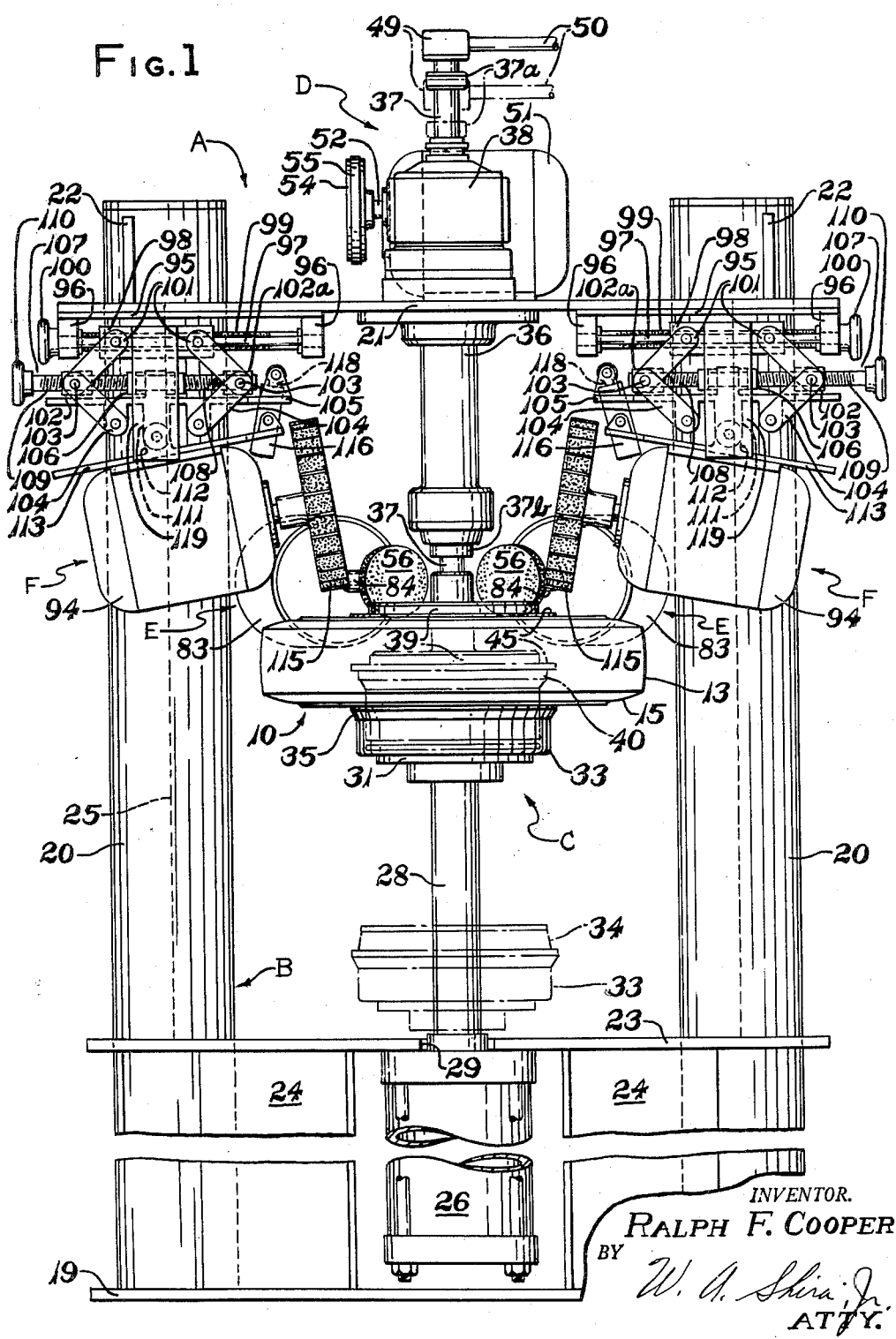

INVENTOR.
RALPH F. COOPER

INVENTOR.
RALPH F. COOPER

United States Patent Office 3,077,060
Patented Feb. 12, 1963

3,077,060
TIRE SIDEWALL GRINDER AND CLEANER MACHINE
Ralph F. Cooper, Akron, Ohio, assignor to The B. F. Goodrich Company, New York, N.Y., a corporation of New York
Filed Oct. 3, 1960, Ser. No. 59,930
4 Claims. (Cl. 51—105)

This invention relates to an apparatus for finishing tires, and, more particularly, to a semi-automatic apparatus for the precision grinding and cleaning of a white sidewall tire.

The conventional method of building a white sidewall passenger car tire includes the application of a strip of white sidewall rubber to the uncured tire carcass with the radial outer periphery of the white rubber overlapping, or overlapped by a thin portion of black rubber. In order for the tire to have visual appeal a clean, sharp line of demarcation between the portions of black and white sidewall material must be produced. Hence, during curing of the tire the sidewall is molded to a configuration including a buffing or scuff rib adjacent the radial outer edge of the white rubber and, preferably, a narrow groove is also formed in the white sidewall side of the tire adjacent the curb scuff rib between the black and white areas of the finished tire.

In the past, following vulcanization, the tire was placed on a rim, generally similar to a conventional vehicle rim, inflated, and the overlapping veneer of rubber was ground in the region of the line of demarcation between the white and black areas by means of a continuous belt grinder or rotating grinding wheel. Due to the fact that the sidewall was curved when the tire was so inflated, the grinding surface presented by the belts or wheel left a visual line of demarcation near the center of the white area at the edge of the surface which had been ground, and hence was now somewhat planar, and the unground surface which remained curved. Attempts were made to overcome this deficiency by grinding the entire white sidewall surface with overlapping grinding wheels or by using specially shaped single wheels of sufficient width to embrace the entire radial width of the sidewall. This was not a satisfactory solution to the problem because of the large amount of high cost white sidewall rubber lost in grinding.

It is an object of this invention, therefore, to provide an improved apparatus for the semi-automatic precision grinding and cleaning of the sidewall of a rubber tire, wherein the sidewalls of said tire are so spread as to present a relatively flat surface for engagement with the grinders and cleaners so that a sharp line of demarcation between the white and black portions of the sidewall, as well as a smooth, clean surface in the white portion is produced.

It is a further object of this invention to provide an improved apparatus for the precision grinding and cleaning of the sidewall of a rubber tire wherein the apparatus has a pair of telescoping split rim tire receiving members that allow the tire mounted thereon to expand, under internal pressure, such that its sidewalls are in a relatively flat position for grinding and cleaning thereof, the said tire receiving members being rotatable to move the tire thereon past rotating grinding and cleaning wheels which selectively engage the sidewall of a tire in timed response to the expansion of said tire.

The manner in which these and other objects and advantages of the invention are obtained will be apparent from the following detailed description of a presently preferred embodiment, illustrated in the accompanying drawings, forming a part of this application, in which:

FIG. 1 is a front elevational view of the apparatus with parts omitted and with the telescoping split rim tire receiving members shown in full line in their closed position supporting a tire in engagement with the grinding wheels, the open position of the tire supporting members being indicated in phantom;

FIG. 2 is a plan view of the apparatus showing the radial positions of the grinding and cleaning wheels relative to the axis of the tire;

FIG. 3 is a detached view, to an enlarged scale, of the telescoping split rim tire receiving members with a tire mounted thereon, the view being partly in transverse section and partly in front elevation;

Figure 6:
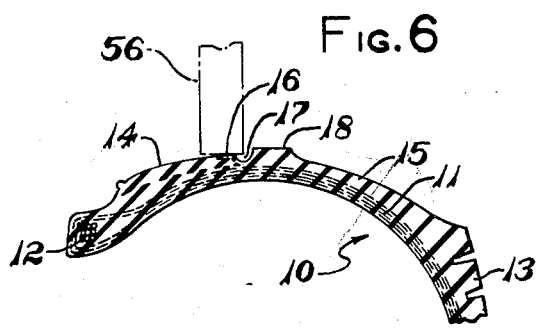
FIG. 6 is a fragmentary cross-sectional view taken along line 6—6 of FIG. 5 with the grinding position of one of the grinding wheels shown in phantom.

The vulcanized tire 10, as shown in FIG. 6, has the usual carcass plies 11 wrapped about inextensible bead cores 12, a tread 13 molded of carbon black reinforced rubber, and a white sidewall portion formed by a band of white sidewall rubber 14. The black sidewall portion 15 may be of the same material as the tread 13, and, a thin skin 16 of black rubber, which may be of the non-staining type, overlies the edge of white rubber 14. Molded into the sidewall 15, adjacent to the white sidewall rubber 14, is a groove 17 next to which is molded a curb scuff rib 18. In order to provide the desired sharp demarcation between the white sidewall 14 and the black sidewall portion 15, the portion of the skin 16 overlying the white sidewall 14 must be ground away and the resultant abraded surface must be cleaned and buffed smooth.

*General Arrangement*

In the presently preferred form, the apparatus A for effecting the required grinding and buffing of the tire 10 has operative portions mounted on a frame B. Frame B comprises a base 19 and two vertical side supports 20, of cylindrical construction, the ends of which are sealed so that the supports may be used as a reservoir for the air used in the pneumatic control system. A cantilever support member 21 is mounted on the upper portions of the vertical side supports 20 and is braced thereto by means of triangular braces 22. A horizontal work platform 23 is mounted between the vertical supports 20 and projects forward therefrom. The platform 23 is spaced vertically from the base 19 by means of a pair of vertical support plates 24 and a vertical back support 25 mounted between the vertical supports 20 and also between the base 19 and the rear edge of the work platform 23. Vertically mounted on the work platform 23 is the lower tire supporting assembly C. The upper tire mounting, rotating and inflation assembly D is mounted on the upper cantilever support 21.

Suspended beneath the cantilever support 21 are a pair of tire sidewall abrading assemblies E and a pair of tire sidewall buffing assemblies F. These are each disposed radially of the axis of the tire mounting assembly D so that the axes of the assemblies E and F intersect the axis of the tire mounting assembly D.

*Tire Mounting, Inflation and Rotating Assemblies*

The lower tire support assembly C comprises a large, double-acting air cylinder 26 mounted on the underside of the work platform 23. This cylinder has a piston 27 from which piston rod 28 extends vertically through a slotted opening 29 in the work platform 23. Rotatably mounted by means of a bearing 30 on the upper end of piston rod 28, see FIG. 3, is a rim hub 31 having an annular rim receiving surface 32 formed on the outer top surface thereof. Removably seated on the surface 32, and mounted thereto by means not shown, is the lower, split rim, tire receiving member 33. The member 33 is so constructed as to have a tire bead base receiving tapered portion 34 and a tire bead seating flange 35 circumferentially formed thereon to hold a tire 10. Thus, a tire 10 may be held thereon and raised for engagement with the assembly D as air is introduced to the lower side of the piston 27.

The upper tire mounting, rotating and inflation assembly D comprises a shaft bearing housing 36 depending from the support 21. A rotatable shaft 37 is journalled in the housing 36 and is capable of limited axial movement therein. The upper portion of shaft 37 projects through the cantilever support 21. A gear reducer 38 is mounted on the upper surface of the cantilever support 21 and has a driving engagement with the shaft 37 by means not shown. Axial movement of the shaft 37 is limited by an upper limit ring 37a which abuts against the upper portion of the gear reducer 38 when shaft 37 is in its lowest position and an adjustable lower limit ring 37b which abuts against the shaft bearing housing 36 when shaft 37 is in its uppermost position, both of which limit rings are mounted on shaft 37 and coaxial therewith.

Mounted on the lower end of the shaft 37 is a tire rim hub member 39 to which an upper split rim tire receiving member 40 is removably attached, by means not shown. The member 40 has a cylindrical face 41 in which is formed a circumferential gasket seating groove 42 containing a circular elastomeric gasket 43 for sealing engagement with the inner annular surface 44 of the lower split rim member 33 as the lower member 33 is raised to engage the upper member 40. At the upper end of the tire receiving member 40 is a tire seating flange 45 with an adjacent tapered shouldered portion 46 to assist in centering and properly seating the tire 10 as it is engaged by the rim member 40.

When a tire 10 is firmly gripped between the split rim members 33 and 40 the tire may be inflated by introducing air under elevated pressure to the inside of the tire by means of an axial passageway 47 in shaft 37, which opens into radial passageways 48 in the upper split rim member 40. Air under pressure is supplied to the upper end of shaft 37 through a rotary pneumatic union 49 which connects the passageway 47 with a source of high pressure air by means of a pneumatic hose 50.

When the tire is being inflated to its predetermined pressure, the sidewalls move apart, the tire bead on the upper side of the tire forcing the tire receiving member 40 upward against the force of gravity until limit ring 37b abuts against the shaft bearing housing 36. Limit ring 37b is adjustably located on shaft 37, in accordance with the size of tire being worked upon, so that at the time it abuts against housing 36 the sidewalls of the tire are each flattened in a horizontal plane.

The tire is rotated at this time by means of a drive motor 51 which is mounted on the upper surface of cantilever support 21 and is connected to the input shaft 52 of the gear reducer 38 by means of sheaves 53 and 54 and an endless belt 55.

*Sidewall Abrading Assembly*

Suspended from the lower side of the upper cantilever support 21 are the sidewall abrading assemblies E. Each assembly E is mounted in such a manner that the position of a fine grit grinding wheel 56 mounted thereon may be adjusted radially of the tire 10 mounted on the rim members 33 and 40. Provision is also made for vertical positioning of the grinding wheel 56 in accordance with the size of the tire being worked upon.

Fastened to the underside of the cantilever support 21, by means not shown, is the main sidewall abrading assembly support plate 57. Depending from the lower side of the support plate 57 and disposed at either end thereof are a pair of vertical support brackets 58 and 59. Mounted between the lower ends of the brackets 58 and 59 are a pair of horizontal parallel guide bars 60. Slidably mounted on the guide bars 60 is a slide bracket 61 having a vertical portion 62 on the upper surface thereof. The portion 62 is tapped with a female thread 63. Journalled between the upper ends of brackets 58 and 59, and parallel to guide bars 60, is a male adjusting screw 64 engaged with the female thread 63 of the slide bracket 61 and having an adjusting hand wheel 65 mounted on its outer end. The construction is such that, as the hand wheel 65 is rotated, the slide bracket 61 is moved horizontally in a direction dependent upon the direction of rotation of the hand wheel 65.

To either side of each end of the slide bracket 61 a toggle link 66 is pivotally mounted thereto by one end; the other end of each pair of the links 66 at the ends of the slide bracket 61 being pivotally mounted on the ends of cross bars 67 and 68, respectively, by means of bolts 69. Cross bar 67 is centrally tapped with a horizontal, right hand female thread, whereas cross bar 68 is centrally tapped with a horizontal, left hand female thread. Also, pivotally mounted each by one end on a bolt 69 are four lower toggle links 70, each having their other ends pivotally mounted by means of bolts 71 to a horizontal platform 72. Mounted on the upper side of the platform 72 is a bracket in which a bearing 73 on an adjusting screw 74 is received for rotary and vertical movement. The adjusting screw 74 has a right hand male threaded portion 75. The threaded portion 75 is engaged with the female thread of cross bar 67. The adjusting screw 74 also has a left hand male threaded portion 76 which is engaged with the female thread of cross bar 68. Therefore, as the screw 74 is rotated by means of a hand wheel 77 mounted on its outer end, cross bars 67 and 68 are moved in opposite directions, and platform 72 is lowered or raised depending upon the direction of rotation of the hand wheel 77. A stop 78 is mounted on the end of the screw 74 opposite hand wheel 77 to prevent cross bar 68 from overriding its thread 76.

On the lower side of the platform 72 is mounted a pivot bracket 79. A second pivot bracket 81 is pivotally connected to bracket 79 by means of a pivot rod 80. A motor mount platform 82 is mounted on the underside of bracket 81. On the underside of the platform 82 is mounted a motor 83 having an extended drive shaft 84. At the outer end of the shaft 84 is mounted the grinding wheel 56 by means of washers 85 and a lock nut 86. The grinding wheel 56 is positioned for grinding by means of a heavy vertical spring 87 mounted on one end of the upper surface of the motor mount platform 82 with its upper end engaged with the lower side of the platform 72 and normally holding the grinding wheel 56 in the position shown in full lines in FIG. 4. Spring 87 is selected so that it just slightly more than counterbalances the weight of the motor 83 in order that the grinding wheel 56 may just "float" on the sidewall of the tire in the grinding position. On the opposite end of the motor mount platform 82 is mounted a single-acting air cylinder 88 having a piston 89 and a piston rod 90 engageable with the lower side of one end of the platform 72. As air is introduced through an air line 91 into the lower side of the normally lowered piston 89, the piston and its piston rod 90 are raised to engage the platform 72, thus causing the motor mount platform 82 to pivot about pivot rod 80 to compress spring 87. A stop rod 92 is mounted on platform 82 inside of the spring 87 to limit pivotal movement of the motor platform 82. In order to prevent swaying movement of the motor 83 from side to side, because of the suspension by the toggle links 66 and 70, there are vertical guide members 93 mounted on either side of the slide bracket 61 and slidably engaged with the sides of the horizontal platform 72.

The motors 94 of the sidewall buffing assemblies F are suspended from the cantilever support 21 and adjustable in a manner substantially like that for mounting and adjusting the grinding motors 83. Thus, the main assembly support plates 95 are mounted on the underside of the cantilever support 21. At the ends of the lower side of each support plate 95 are mounted support brackets 96, between which are mounted a pair of horizontal parallel guide bars 97. Slidably mounted on the bars 97 is a slide bracket 98 centrally tapped with a female thread, not shown. Also mounted between brackets 96, and journalled therein, is a male adjusting screw 99 engaged in the female thread of the slide bracket 98. On the outer end of the screw 99 is mounted a hand wheel 100. The hand wheel 100 may be rotated to horizontally position the slide bracket 98.

Pivotally mounted by one end on the ends of the sides of the bracket 98 are upper toggle links 101 which are also pivotally mounted at their other ends to cross bars 102 and 102a, by means of bolts 103. Also pivotally mounted to bolts 103 by their ends are lower toggle links 104 which are pivotally mounted by their other ends to a horizontal platform 105. On the upper side of platform 105 is mounted a bracket in which a bearing 106 is received for rotary and vertical movement. Cross bar 102 is centrally tapped with a left hand female thread and cross bar 102a with a right hand female thread. Held by bearing 106 is an adjusting rod 107 having a left hand male threaded portion 108 engaged in the female thread of cross bar 102, and a right hand male threaded portion 109 engaged in the female thread of cross bar 102a. A hand wheel 110 is mounted on the outer end of the adjusting rod 107 for rotation thereof. Rotation of the rod 107 raises or lowers the platform 105 depending upon the direction of rotation of rod 107.

Pivotally mounted to a vertically extended pivot bracket 111 on the lower side of platform 105, by means of its pivot bracket 112, is a motor mount platform 113. To the underside of the platform 113 is mounted the buffing motor 94 which drives a radially laminated buffing wheel 115. The buffing wheel is lowered and raised by means of a double-acting air cylinder 116 pivotally mounted to the side of motor platform 113, and having a piston 117 and a piston rod 118, see FIGS. 1 and 7. The outer end of the piston rod 118 is pivotally mounted to the horizontal platform 105 and the opposite end of the cylinder 116 is pivotally mounted on one end of the motor platform 113. Thus, as air is introduced to the lower side of piston 117 and exhausted from the upper side, the buffing wheel 115 is lowered to buffing contact with the sidewall of a tire 10. The motors 94 are also restrained from side sway on the toggle links 101 and 104 by means of vertical guide members 119 mounted on the sides of slide brackets 98 and slidably engaged with the sides of horizontal platform 105.

*Pneumatic Circuit*

All of the pneumatically operative components of the apparatus A are operated from a single outside source of high pressure air, not shown. Air is supplied to the apparatus from this source by a feed line 120, containing a main shutoff valve 121. The stream of air is divided, as at 122, into two main lines, 123 and 124. Line 123 furnishes air to the upper split rim member 40 for inflation of the tire 10, and line 124 furnishes air for raising the lower split rim member 33, as well as air for the single-acting air cylinders 88, used to position the grinding wheels 56, and the double-acting air cylinders 116, used to position the buffing wheels 115. A pressure regulator 125 is located in line 123 to control the pressure supplied to the air reservoirs formed by the vertical side support members 20. The air is conducted from the reservoirs 20 by air line 126 to a 3-way solenoid-operated, spring return air valve 127 which, when energized, allows air to flow in line 128. Line 128 is connected to the flexible air hose 50 attached to the rotary union 49 at the upper end of the shaft 37. Thus, air may be brought to the axial passageway 47 in shaft 37 and then to the tire by means of the radial passageways 48 in the upper split rim member 40. When solenoid valve 127 is deenergized it returns to its normally closed position and line 128 is exhausted through the valve to exhaust line 129.

A pressure regulator 130 is located in main line 124 to control the pressure applied to the air cylinders 26, 88 and 116. Line 124 is tapped as at 131 to provide air for the double-acting air cylinder 26. A short line 132 brings the air to a 4-way solenoid operated spring return air valve 133 which, in its normal position, directs air through line 134 to the upper side of the piston 27 of the large, double-acting air cylinder 26. Line 134 contains air speed control valve 135 which allows full flow in line portion 134a when it supplies air to cylinder 126, and provides controlled, reduced reversed flow in line 134 when piston 27 of the cylinder 26 is being raised, thus preventing the hazard of a fast closure of the split rim members 33 and 40. When the valve 133 is energized, air from line 132 is directed to line 136 and line 134 is exhausted to exhaust line 137. Line 136 also contains an air speed control valve 138 allowing full flow in the direction of the cylinder 26 and reduced, controlled flow in the opposite direction. Line 136 is branched as at 139 into two lines, 136a and 136b which join again at 140. In branch 136a is located a solenoid-operated spring return valve 141, which when energized along with energization of solenoid valve 133, allows air to pass freely into the cylinder 26 below the lower side of piston 27 to raise the lower split rim 33. In branch line 136b is located a check valve 143 allowing full flow of air to the cylinder 26 but very restricted flow in the opposite direction. Thus, in case of a power failure while the tire is inflated on the split rim, the 2-way solenoid valve 141 is closed and the cylinder 26 can be exhausted on the lower side of piston 27 only through the check valve 143 to line 136 and valve 133 to exhaust line 137. The lower split rim member 33 is then lowered slowly allowing the tire to deflate through solenoid valve 127 rather than by a dangerous explosive decompression in the close proximity of the operator if the lower rim member 33 were to drop suddenly. In normal operation when solenoid valve 133 is deenergized, air under pressure is admitted to the top side of the piston 27 of the cylinder 26 forcing it downward and exhausting the lower side through solenoid valves 141 and 133 to exhaust line 137.

Figure 4:
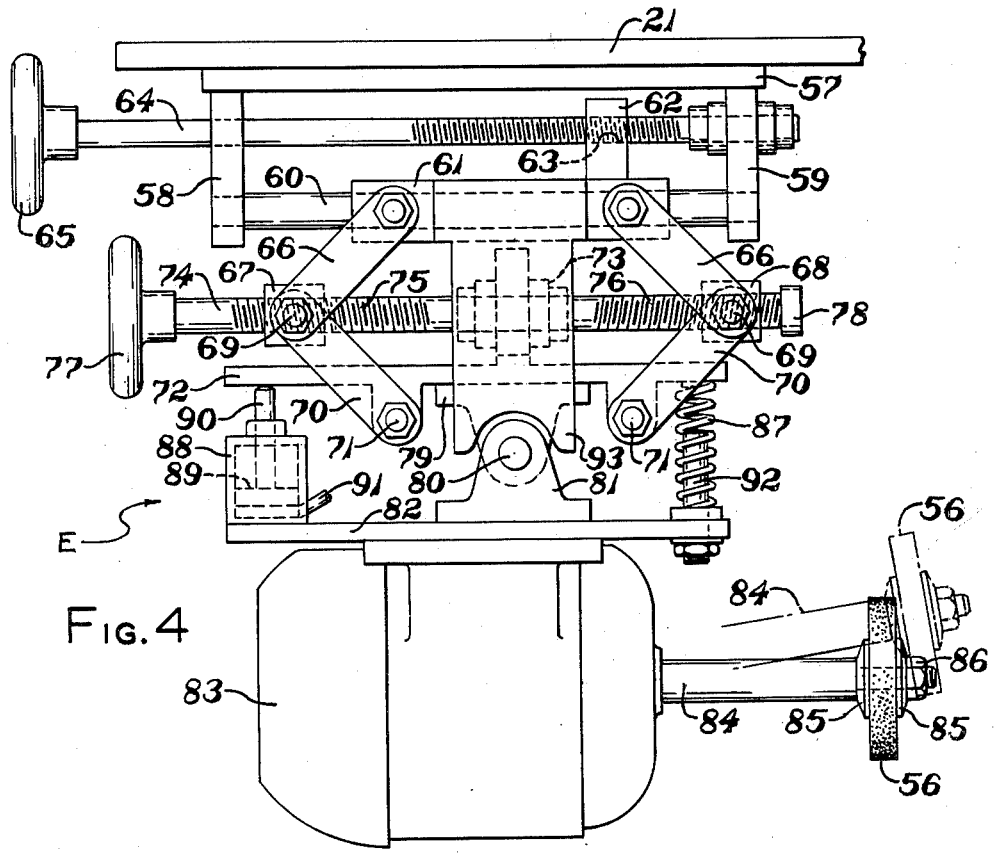
FIG. 4 is a side elevational view to an enlarged scale of one of the tire grinders showing its carriage mounting.
Figure 5:
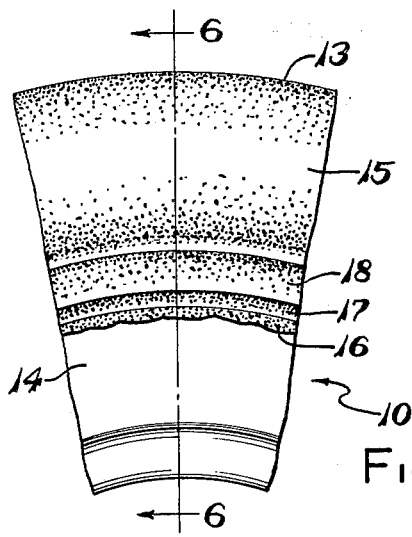
FIG. 5 is a fragmentary side view of a tire prior to being ground and cleaned on the apparatus.
Figure 7:
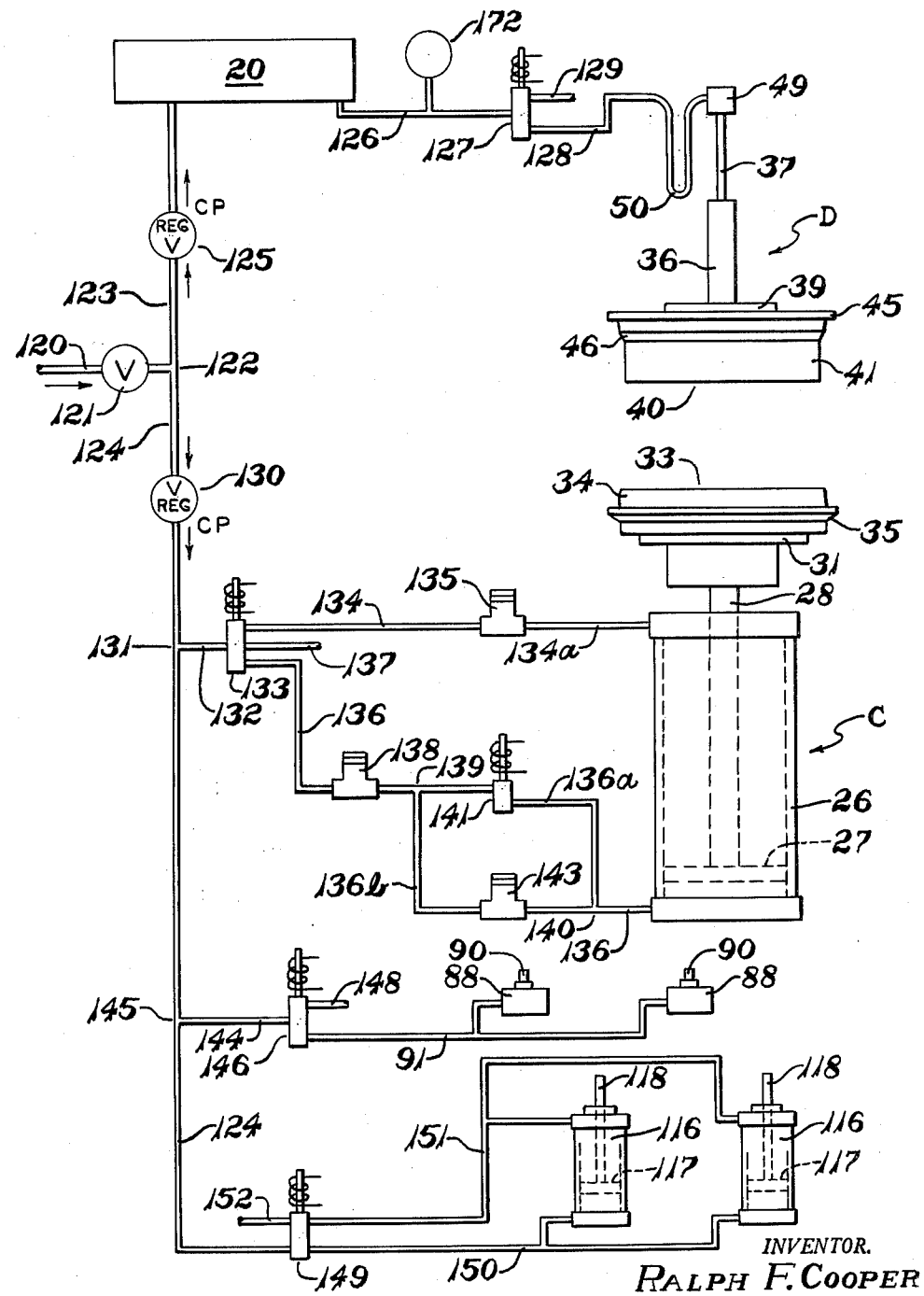
FIG. 7 is a schematic representation of the pneumatic control lines and devices used on the apparatus.

A feed line 144 is connected to the main line 124 at 145 to bring air to a solenoid operated spring return valve 146. When solenoid valve 146 is energized, air is directed to line 91 forcing piston 89 and piston rod 90 of the single-acting air cylinders 88, as seen in FIGS. 4 and 7, to move upward to engage the underside of the horizontal platform 72, thus pivoting motor platforms 82 to raise the grinding wheels 56 from the sidewall of the tire 10. When solenoid valve 146 is deenergized, air from the cylinders 88 is exhausted, by the action of the springs 87 of the grinding assembly E, through exhaust line 148 of the solenoid valve 146.

The end of main line 124 is connected to a 4-way solenoid operated spring return valve 149 which, when energized, directs air through bifurcated air line 150 to the lower side of pistons 117 of air cylinders 116 and allows air to be exhausted from the opposite sides through bifurcated air line 151 and valve 149 to exhaust line 152. Piston rods 118 are thus extended to effect a lowering of the buffing wheels 115 to the sidewall of the tire 10.

Upon deenergization of the solenoid valve 149 air is charged to the cylinders 116 through line 151 and exhausted through line 150 to line 152 to raise the buffing wheels 115 from the tire 10.

Electrical Control Circuit

Figure 8:
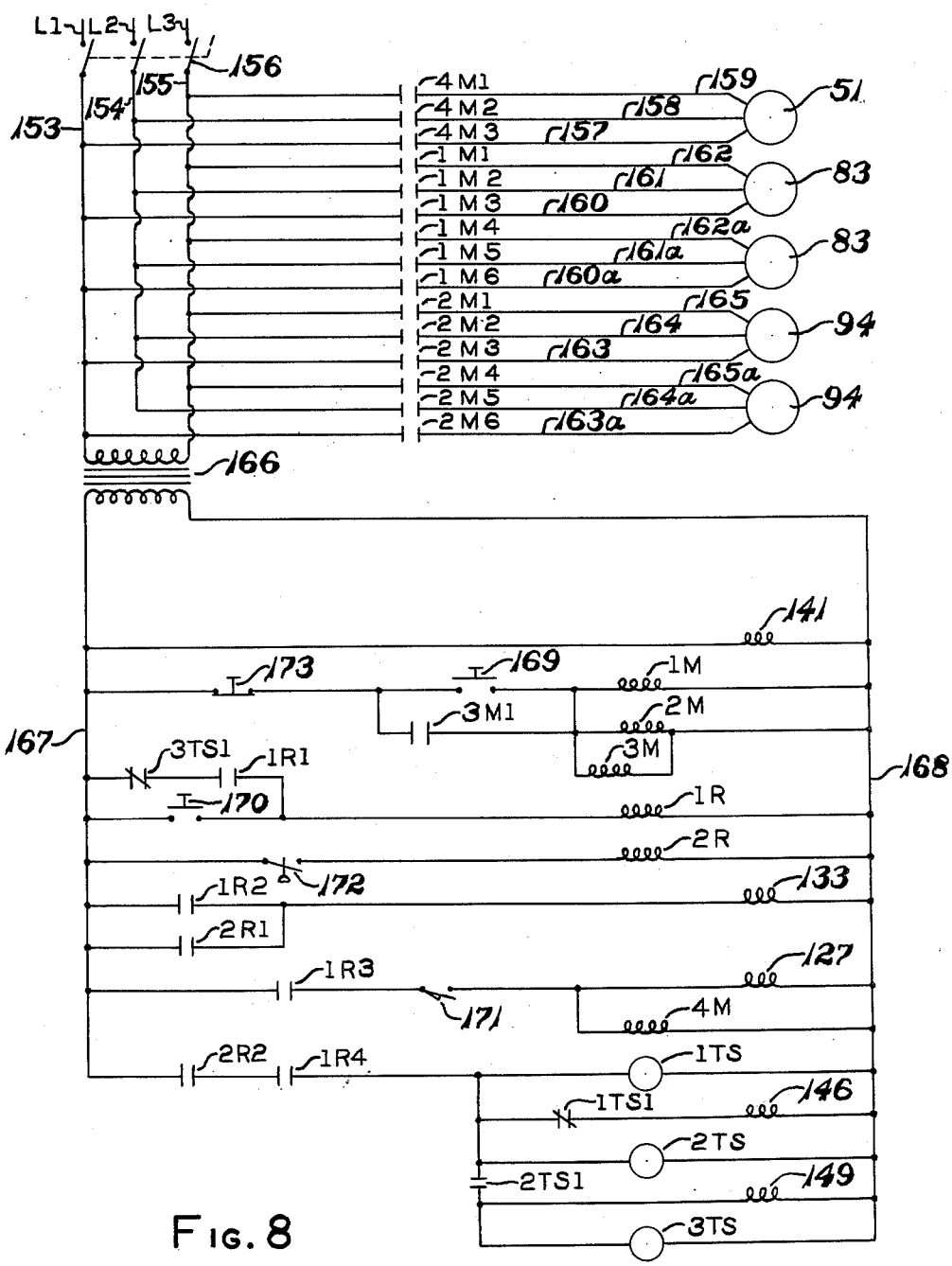
FIG. 8 is a schematic, across-the-line, wiring diagram of the electrical control circuit for the apparatus.

As seen in FIG. 8, power for the electrical control circuit is conducted from a source of alternating electrical current, not shown, of the 3-phase, high voltage type by means of electrical supply lines L1, L2, and L3. Supply lines L1, L2, and L3 are connectible with conduit lines 153, 154, and 155, respectively, by means of a triple pole, single throw type switch 156. The split rim drive motor 51 is connected to conduits 153, 154, and 155 by wires 157, 158 and 159, respectively, which wires contain switch contacts 4M3, 4M2, and 4M1, respectively. The grinder motors 83 are each connected to conduits 153, 154, and 155 by wires 160, 161, 162, and 160a, 161a, and 162a, respectively. The buffing motors 94 are connected to conduits 153, 154, and 155 by wires 163, 164, and 165, and 163a, 164a, and 165a, respectively. A step-down transformer 166 has its primary coil connected between conduits 153 and 155 to produce lower voltage in its secondary coil, which is connected to distribution wires or bus bars 167 and 168. A more comprehensive understanding of the electrical control circuit may be obtained from the description of the machine operation which follows. For ease of understanding, such items as overload circuit breakers, and fuses have not been shown.

Machine Operation

To begin operation, the operator opens the air valve 121, throws switch 156 to energize the circuit and places a tire 10 on the lower split rim member 33 which is then at its lower position separated from member 40. Solenoid valve 141 is instantly energized to open airline 136a. The operator then momentarily depresses a start button 169 which energizes relays 1M, 2M, and 3M. Energization of relay 1M closes its contacts 1M1, 1M2, 1M3, 1M4, 1M5 and 1M6 to start the grinding motors 83. Energization of relay 2M closes its contacts 2M1, 2M2, 2M3, 2M4, 2M5, and 2M6 to start the buffing motors 94. Energization of relay 3M closes its contact 3M1 to effect a holding circuit about the start switch 169.

The operator then depresses the start cycle button 170 to energize relay 1R. Energization of relay 1R closes its contact 1R1 to effect a holding circuit about the start button 170, closes its contacts 1R2 which allows energization of the solenoid valve 133. Valve 133 directs air to the underside of piston 27 of the large double-acting air cylinder 26 to raise the lower split rim member 33 with the tire 10 mounted thereon the entire length of the piston stroke. Energization of relay 1R also closes contacts 1R3 and 1R4 to set up their respective circuits. As the lower split rim member 33 telescopically engages the upper split rim member 40, the upper bead of the tire 10 rides up to tapered rim surface 46 and becomes seated against the seating flange 45. Continued raising of the tire 10 causes the upper rim member 40, shaft 37 and the rotary union 49 to rise a small distance, on the order of ¼ inch, to close the normally open limit switch 171. Closure of limit switch 171 energizes solenoid valve 127 to direct air to the inside of the tire 10, expanding the sidewalls of the tire 10 outward into a relatively flat horizontal position ready for finishing, thus raising upper rim member 40 until limit ring 37b engages housing 36, and also energizing relay 4M. Energization of relay 4M causes its contacts 4M1, 4M2 and 4M3 to close to start the rim drive motor 51 which rotates the tire about its axis. When a predetermined pressure is obtained in the tire 10, a pressure switch 172, located in the air feed line, is closed to energize relay 2R. Energization of relay 2R closes its contacts 2R1 and 2R2. Closure of contact 2R1 effects a sealing circuit about contact 1R2 which will be open before it is desired to deenergize solenoid 133. Closure of contact 2R2 energizes a timer switch 1TS, a solenoid valve 146, and a second timer switch 2TS. Energization of normally open solenoid valve 146 causes it to close to exhaust air from the single-acting air cylinders 88, thus allowing the grinding wheels 56 to lower to abrading contact with the sidewall of the tire 10.

At the expiration of a predetermined time for which it was set, timer switch 1TS acts to open its normally closed contacts 1TS1 and holds them open until the entire circuit is deenergized. Opening of contacts 1TS1 deenergizes solenoid valve 146, returning it to its normally open position to direct air to the cylinders 88 to raise the abrading wheel 56 from the sidewall of the tire 10. At this time timer switch 2TS times out to close its contacts 2TS1 effecting energization of solenoid valve 149 and a third timer 3TS. Contacts 2TS1 are held in closed position by the operation of the timer 2TS until the circuit in which the timer is located is deenergized. Energization of solenoid valve 149 directs air through line 151 to lower pistons 117 in air cylinders 116 and bring the buffing wheels 115 into engagement with the abraded sidewall of the tire 10 for a predetermined time. At the expiration of that time timer 3TS operates to open its normally closed contacts 3TS1, deenergizing relay 1R. Deenergization of relay 1R reopens all of its contacts 1R1, 1R2, 1R3, and 1R4 to deenergize their respective circuits with the exception of the sub-circuit containing by-pass contact 2R1. Thus, solenoid valve 127 is deenergized to allow air to exhaust from the tire 10 through line 129, and relay 4M is deenergized to shut down the rim drive motor 51. Also, solenoid valve 149 is deenergized to raise the buffing wheel 115 from the sidewall of the tire 10.

When the air pressure in the tire 10 drops below a predetermined value, pressure switch 172 is opened to deenergize relay 2R. Deenergization of relay 2R causes its contacts 2R1 and 2R2 to open, deenergizing solenoid valve 133, and directing air through line 134 to the upper side of piston 27 in cylinder 26, thus lowering the tire 10 from the upper split rim member 40 and allowing the operator to remove the finished tire. Opening of the relay contact 1R4 also deenerigizes all of the timers 1TS, 2TS, and 3TS which return their respective contacts to their normal position. The apparatus A is now in readiness for finishing another tire 10. The operator may, upon completion of the finishing cycle, shut off all the motors by momentarily depressing the button of stop switch 173. This deenergizes relays 1M, 2M, and 3M to shut down the grinding motors 83 and the buffing motors 94, and to deenergize the holding circuit about start switch 169.

While this invention has been described as it is incorporated in a specific apparatus, changes and modifications, readily apparent to those skilled in the art, may be made. These are considered as being within the spirit and scope of the invention as defined in the appended claims.

Having thus described the invention, I claim:

1. An apparatus for the abrading and cleaning of the sidewall of an inflatable rubber tire comprising a frame; a pair of telescoping tire receiving rim members axially, movably and rotatably mounted on said frame; means to move said tire receiving rim members to and from telescoping fluid pressure sealing engagement with each other through the central opening of a tire; means responsive to the axial movement of one of said rim members to inflate said tire mounted thereon to a predetermined pressure and to initiate rotation of the tire, one of said rim members being axially movable relative to the other while the members remain in telescoping engagement to permit the tire sidewalls to flatten in planes perpendicular to the axis of said tire when the tire is inflated; tire sidewall abrading means movably mounted on said frame; tire sidewall cleaning means movably mounted on said frame; means responsive to the inflation of said tire to a predetermined pressure to urge said abrading means into abrading contact with the sidewall of said mounted tire for a predetermined time and after the elapse of said predetermined time to remove said abrading means from said abrading contact; a time controlled means operable a first predetermined time after movement of said abrading means from engagement with the tire to effect lowering of said tire sidewall cleaning means into contact with said tire sidewall and raising of said cleaning means from said tire sidewall after a second predetermined time.

2. Apparatus for the abrading and cleaning of the sidewall of an inflatable rubber tire comprising a frame; first and second telescoping tire receiving rim members axially, movably and rotatably mounted on said frame; means to move the first of said rim members a predetermined axial distance into telescoping engagement with the second of said rim members through the central opening of a tire and to axially move the second of said rim members after engagement of the members; means responsive to the axial movement of said second rim member to inflate said tire mounted thereon to a predetermined pressure and to initiate rotation of the tire, the said second rim member being axially movable relative to the first rim member under the force of said predetermined pressure to a position in which the sidewalls of the tire mounted on said rim members are flattened in planes perpendicular to the axis of said tire; and tire abrading and buffing means supported on said frame for movement to and from engagement with the flattened sidewall of a tire mounted on said rim members.

3. Apparatus for abrading and cleaning the sidewall of an inflatable rubber tire, comprising a frame, a lower tire receiving rim member rotatably and axially movably mounted on said frame, an upper tire receiving rim member rotatably and axially movably mounted on said frame above and in axial alignment with said lower rim member, means to move one of said rim members to and from telescoping engagement with the other of said rim members through the central opening of a tire, means to inflate a tire while mounted on said rim members, means allowing limited axial movement of said other rim member in a direction away from said one of said rim members to a position at which the sidewall of said tire so inflated is flattened in a plane perpendicular to the axis of said tire, means to rotate said rim members and a tire mounted thereon, and tire abrading and buffing means mounted on said frame for movement to and from engagement with a tire mounted on said rim members.

4. An apparatus for the semi-automatic abrading and cleaning of the sidewall of an inflatable rubber tire, comprising a frame, a pair of telescoping tire receiving rim members, the first one of said tire receiving members being rotatably and axially movably mounted on said frame, the second of said tire receiving members being rotatably and axially movably mounted on said frame above and in axial alignment with said first rim member, a fluid pressure sealing member circumferentially mounted on one of said rim members for telescoping engagement with the other of said rim members, fluid pressure means to move said first tire receiving member to and from telescoping fluid pressure sealing engagement with the second said tire receiving member through the central opening of a tire, means responsive to axial movement of said second tire receiving member in a direction of movement of the said first tire receiving member to inflate said tire while mounted on said tire receiving members to a predetermined pressure and to initiate rotation of said tire receiving members and said tire mounted thereon, the said second tire receiving member being moved axially away from the said first tire receiving member by inflation of a tire mounted thereon, means limiting the total axial movement of said second tire receiving member away from said first tire receiving member at a position at which the sidewalls of said tire are flattened in planes perpendicular to the axes of said tire receiving members, tire sidewall abrading means movably mounted on said frame, tire sidewall cleaning means movably mounted on said frame, a means responsive to the inflation of said tire to said predetermined pressure to urge said abrading means into abrading contact with a sidewall of said mounted tire for a predetermined time and after the elapse of said predetermined time to remove said abrading means from said abrading contact, a time controlled means operable a first predetermined time after movement of said abrading means from engagement with said sidewall to lower said tire sidewall cleaning means into contact with said tire sidewall and to raise said cleaning means from said tire sidewall after a second predetermined time.

References Cited in the file of this patent

UNITED STATES PATENTS

| 2,707,851 | Strong | May 10, 1955 |
| 2,893,172 | Schrank | July 7, 1959 |
| 2,986,849 | Clark | June 6, 1961 |

FOREIGN PATENTS

| 843,530 | Great Britain | Aug. 4, 1960 |